United States Patent [19]
Bux et al.

[11] Patent Number: 4,726,018
[45] Date of Patent: Feb. 16, 1988

[54] METHOD OF PROVIDING PRIORITY ACCESS TO A TRANSMISSION COMMUNICATION RING

[75] Inventors: Werner K. Bux, Richterswil, Fed. Rep. of Germany; Daniel M. Dias, Mahopac; Ambuj Goyal, Amawalk, both of N.Y.

[73] Assignee: International Business Machines Corporation, Armonk, N.Y.

[21] Appl. No.: 899,687

[22] Filed: Aug. 25, 1986

[51] Int. Cl.⁴ .............................................. H04J 3/26
[52] U.S. Cl. ................................. 370/89; 340/825.5
[58] Field of Search ................ 370/89, 90; 340/825.5, 340/825.05

[56] References Cited

U.S. PATENT DOCUMENTS 4,602,365 7/1986 White et al. ........................ 370/89
4,680,757 7/1987 Murakami et al. .................. 370/89

Primary Examiner—Douglas W. Olms
Assistant Examiner—Min Jung
Attorney, Agent, or Firm—Douglas W. Cameron

[57] ABSTRACT

In a communication system comprising several stations, access to the ring is granted to one station at a time by circulating a token on the ring and updating the priority of the token is disclosed. This invention provides for a first station to transmit a token immediately after it has finished transmitting a frame containing a packet(s) needed to be transmitted from the first station without waiting for the header of the frame to return to the first station. A priority signalling packet is then transmitted on the ring from the first station after the first station transmits the token on the ring. This priority signalling packet contains information as to the particular priority level that the token should be updated to. Finally, the priority level of the token is updated to correspond to the particular priority level when the priority signalling packet reaches the station that holds the token.

20 Claims, 14 Drawing Figures

FRAME FORMAT

TOKEN FORMAT

PRIORITY 0 STATION TRANSMITS PACKET OR FRAME

PACKET OR FRAME GETS TO PRIORITY 1 STATION THAT CHANGES PRIORITY SIGNALLING BIT

PACKET OR FRAME COMES BACK TO SOURCE STATION

PACKET OR FRAME GETS BACK TO SOURCE STATION PRIORITY SIGNALLING PACKET BEING TRANSMITTED

PRIORITY SIGNALLING PACKET REACHES THE STATION TRANSMITTING PACKET

TRANSMIT PRIORITY 1 TOKEN

PRIORITY 1 STATION SEIZES TOKEN

TIMING DIAGRAM FOR VOICE DATA INTEGRATION

METHOD OF PROVIDING PRIORITY ACCESS TO A TRANSMISSION COMMUNICATION RING

TECHNICAL FIELD

This invention relates to a method of providing priority access to a communications ring by a number of stations interconnected by the ring. More specifically, this invention provides a method of updating the priority level of a token by using a priority signalling packet.

DESCRIPTION OF THE PRIOR ART

Numerous ring transmission systems are known in which asynchronously occurring data as well as synchronous information can be transmitted.

U.S. Pat. No. 4,482,999 to P. A. Jansen et al entitled, "Method of Transmitting Information Between Stations attached to a Unidirectional Transmission Ring" describes a method of providing a guaranteed transmission opportunity for synchronous or circuit switched data in periodic time intervals to authorized stations. This method is based on the single token ring method, wherein a station that holds the token transmits its data and releases the token after the header of the frame it transmitted comes back to it after traversing the ring. However, this method becomes inefficient at high speeds (around 10 megabits/sec or higher) and/or long distances (around 10 kilometers or longer).

U.S. Pat. No. 3,639,904 to J. A. Arulpragasam describes a transmission ring for multiple access. This method is for a master-slave operation, controlled by a central station that transmits a succession of time slots in the ring. This method is a slotted protocol with character interleaving under the control of the central station. Any priority in access is provided through a central station that can reject a transmission request from a slave terminal. Thus, failure of the master (central station) results in failure of the entire ring. The slotted protocol results in inefficient use of system bandwidth.

U.S. Pat. No. 4,379,294 to J. F. Sutherland et al entitled, "Data Highway Access Control System" describes a bus access scheme with fixed priority assignments according to position or the bus. Thus, a station at a certain position on the bus could not be assigned a different priority level according to the nature of the packets or frames that the station needs to transmit.

A timed token ring protocol is described in U.S. Pat. No. 4,454,508 to R. M. Grow. The basic idea of this patent is that each station measures the time between successive arrivals (token rotation time) of the token. Low priority Stations refrain from accessing the ring if the token rotation time exceeds a set maximum called target token rotation time. High priority stations may require very short token rotation times so that a high priority station may access the ring very shortly after some event. Such short target token rotation times would be needed especially for alarm stations or network management stations. If the set maximum is low, poor ring bandwidth utilization would occur although alarm or network management stations require quick accesses very seldom. Another shortcoming of Grow's invention is that synchronous or circuit switched data will be subject to jitter because of irregular intervals between successive arrivals of the token.

Consequently, a need exists for a method of providing priority access to a transmission ring to overcome the aforementioned shortcomings. More specifically, a method is needed which will provide efficient transmission with high speeds over long distances with peer to peer access control, an efficient means of providing access for low priority stations, and stations which have a variable priority level.

SUMMARY OF THE INVENTION

The present invention provides a method of satisfying the aforementioned problems. This method provides for priority access to a transmission ring so as to provide efficient utilization of system bandwidth at high speeds and long distances. Furthermore, this invention provides for essentially peer to peer access to a the ring by stations with variable priority levels.

Accordingly, the present invention provides a method of transmitting a token around a transmission ring and for changing the priority level of the token as it circulates around the ring. First, a token is transmitted on the ring from a first station immediately after the first station transmits a frame containing a packet or a number of packets, without waiting for the header of the frame containing the packet or packets to return to the first station. Second, a priority signalling packet is transmitted on the ring from the first station when the header returns, after the first station transmits the token on the ring. This signalling packet contains information as to a particular priority level that a token should be updated to. Priority signalling packets could also be generated by a high priority station when the station is not repeating a frame or a priority signalling packet.

Finally, when the priority signalling packet reaches a second station that holds the token, the priority level of the token is changed to correspond to the particular priority level. The key here is that the token is released from a station immediately after the station has transmitted its packets, and the priority signalling packet which is later released is used to update the priority level of the token. Thus, no time is lost in waiting for the frame containing the packets to return to the station before the token is released. Synchronous transmission can also be achieved by having a voice controller periodically transmit a priority signalling packet or making a reservation on a repeated header with an appropriate priority level being indicated by the priority signalling bits in the priority signalling packets.

DESCRIPTION OF THE PREFERRED EMBODIMENT

Figure 1:
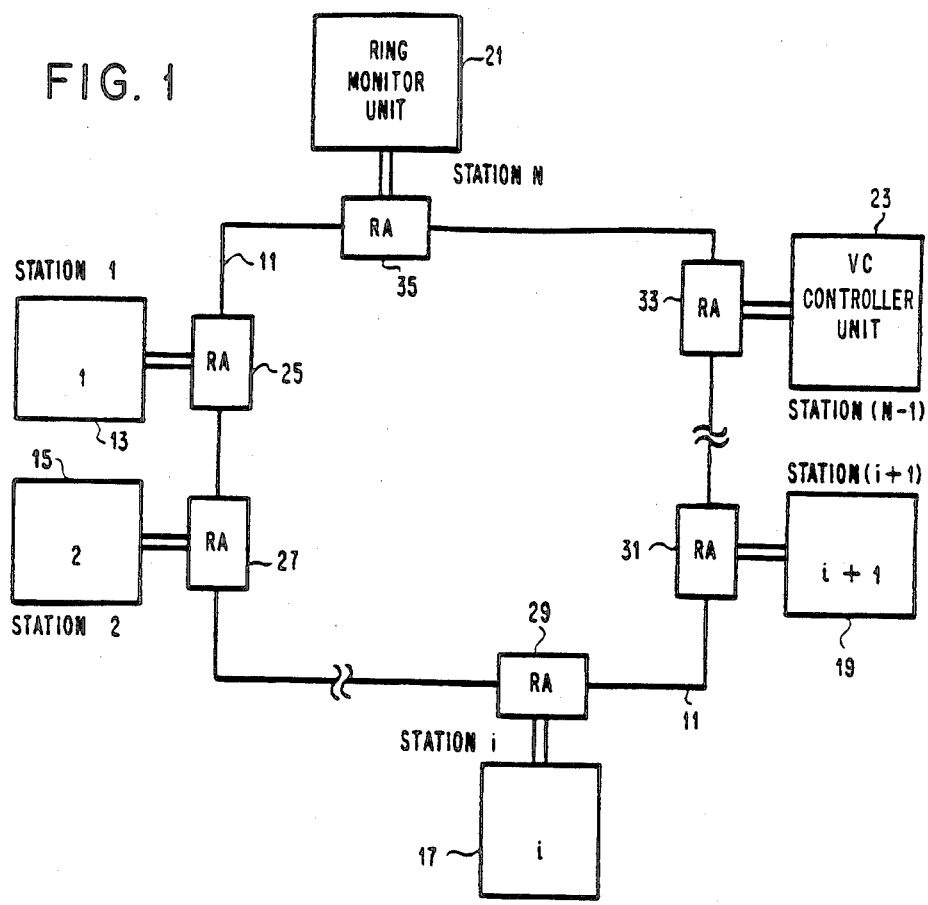
FIG. 1 is an overall schematic block diagram of a communications ring interconnecting a plurality of stations.

The basic structure of the communication system in which the present invention finds application is shown in FIG. 1. It includes a closed-loop, unidirectional transmission ring 11 interconnecting a plurality of stations 13, 15, 17 and 19. Each station may comprise one of several devices such as display terminals, minicomputers, data collectors and telephone type apparatus. The system serves for exchanging data between these devices. This data can be synchronous or asynchronous. Stations which transmit only synchronous data shall be referred to as voice stations, while stations that transmit only asynchronous data shall be referred to as data stations.

The system has a ring monitor unit 21 which does some error checking and recovery and may provide clocking but has no central control. Thus, the communication system is decentralized, and stations can be independent units having equal rights (peer-type). The monitor functions may be added to a normal station for economy and recovery reasons, but the ring monitor can as well be a separate unit.

A further unit, the circuit switch monitor or voice controller 23, is provided on the ring. Its purpose is to support the circuit switch functions of the present invention in the system. The voice controller can either be combined with the basic ring monitor, or can be an additional part of a normal data terminal unit, separate from the ring monitor. In the present embodiment, the latter solution was chosen.

Each of the stations and monitor units is connected to the transmission ring by a ring attachment RA 25, 27, 29, 31, 33, 35. Each station unit or monitor unit, together with the associated ring attachment RA, is called a "station" in the following. Thus stations 1 . . . N are provided on the ring as shown in FIG. 1.

Each ring attachment RA includes Ring Insert Switch circuitry (RIS) and Ring Access Control circuitry (RAC). Ring insert switch circuitry RIS includes switches for either connecting the station into the ring, or for bypassing the station, i.e., closing the ring without the station being inserted. RIS also has repeater functions, i.e., amplification and reshaping of pulse signals, and comprises clock extraction circuitry that derives a clock signal from the received data. Each RIS further includes a delay circuit followed by a switch that is controlled from the RAC to allow either forwarding of received data with a given delay, or replacing the delayed data by data from the station. Delay in RA 25 . . . 31 for normal stations is only 1 bit; delay in RA 33 and 35 for monitors will be longer, e.g., a few bytes. Any active station receives all data signals passing on ring 11, and will either repeat the received data signals, or apply its own data signals to the next section of ring 11.

Figure 2:
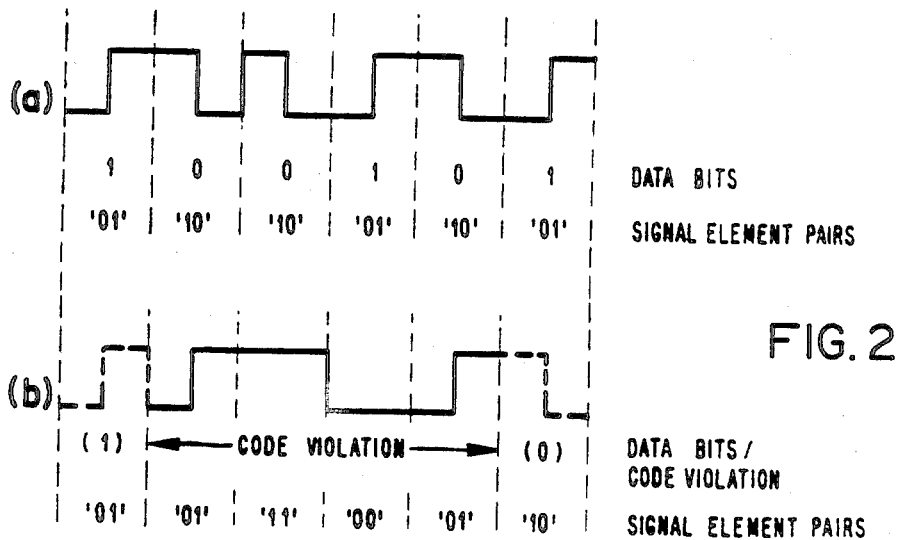
FIG. 2 shows the wave forms used for transmission of data.

Transmission of data on the ring is bit-sequential in a form that is shown in part (a) of FIG. 2 and is also known as the Manchester Code. The data signal assumes either one of two levels, and each "1" data bit is represented by a transition from low to high, each "0" data bit by a reverse transition. Thus, each data bit can be represented by a transmission signal element pair as follows:
data bit 1=transmission signal element pair '01'
data bit 0=transmission signal element pair '10'

For delimiting and frame recognition, a code violation corresponding to four data bits is defined, as shown in part (b) of FIG. 2. Thus, each code violation is represented by the following sequence of four signal element pairs:
code violation=pattern '01'11'00'01'
The signal representations are, of course, only one of many possible embodiments and are no prerequisite for practicing the invention.

Transmission on the ring is basically in the form of variable-length frames or packets. The terms "frames" and "packets" will be used interchangeably. Normal frames are not necessarily periodic, i.e., the system is not slotted.

The terms "frame" and "packet" can be used interchangeably for the purposes of this application, since both are merely a sequence of bits, although a frame can be spoken of as containing a packet(s) of synchronous or asynchronous data. In such case, the packet follows the header and precedes the end delimiter. Also, in such case, the packet is essentially a unit of information to be passed between stations, and it generally comprises synchronous or asynchronous data and address and control information. A packet or frame is also said to be transmitted "on the ring" or "around the ring". Transmission on or around the ring merely means that the frame is sent out of the sending station and passed along the ring until it returns to the sending station.

Figure 4:
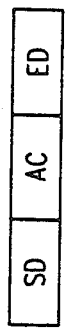
FIG. 4 illustrates the basic token format.

Each station monitors all data passing around the ring, and the right to transmit data is transmitted around the ring from station to station by a token (see FIG. 4). A free token is represented by a bit (TK=0) in the Access Control (AC) field (see below). (TK=1) implies that the token is busy and a frame follows the token. A station that wants to transmit seizes the free token, makes it a busy token, sends (transmits) its data packet (together with a destination address), and thereafter issues a new free token. Due to the 1-bit delay in each normal station's ring adapter, the token bit value can be correctly recognized and changed if necessary within one bit period. The term "token" shall hereinafter be referred to as "free term" unless indicated otherwise. The basic token format shown in FIG. 4, comprises a start delimiter (SD), an access control field (AC) and an end delimiter (ED). The ring monitor issues, after startup, the first frame header including a free token indication, followed by a sequence of "1" bits (i.e., signal element pairs '01') to maintain synchronization. This sequence of "1" bits is referred to as Idle Signal. The monitor watches the passing of correct headers, replaces mutilated headers or, after some timeout, replaces a lost token. The voice controller also periodically transmits a priority signalling packet on the ring or makes a reservation on a repeated frame with priority level corresponding to voice controller priority level.

The details of the circuitry such as the ring attachments (RAs), the voice controller, and monitor unit and the stations in general is well know to those skilled in the art. These details are fully described in U.S. Pat. No. 4,482,999 issued to P. A. Janson et al, entitled, "Method of Transmitting Information Between Stations Attached to a Unidirectional Transmission Ring" which was issued on Nov. 13, 1984.

Basic Frame Structure

Figure 3:
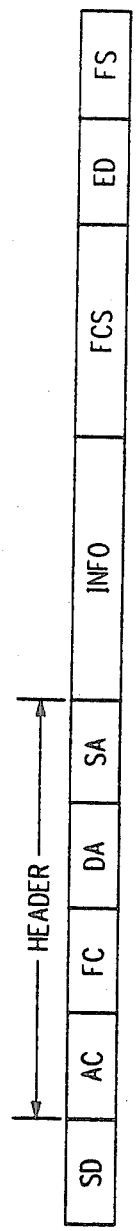
FIG. 3 illustrates the basic frame format.

The frame structure used in the preferred embodiment of this invention is shown in FIG. 3 which is similar to the frame structure described in the "IEEE 802.5

Local Network Standard", IEEE Computer Society, Silver Spring, Md. (1985), hereinafter referred to as the "IEEE 802.5 Standard". Each frame 40 comprises a number of fields. The fields of the frame will be described in the sequence in which they are transmitted. The first field is the start delimiter (SD) which is followed by the access control field (AC), a frame control field (FC), a destination address field (DA), and a source address (SA). These last four fields (AC+FC+DA+SA) taken together are known as the frame header. The header is followed by a variable length information field (INFO) of given minimum and maximum length. Following the information field is the frame check sequence field (FCS) the end delimiter (ED) and the frame status field (FS).

Delimiters

Figure 5:
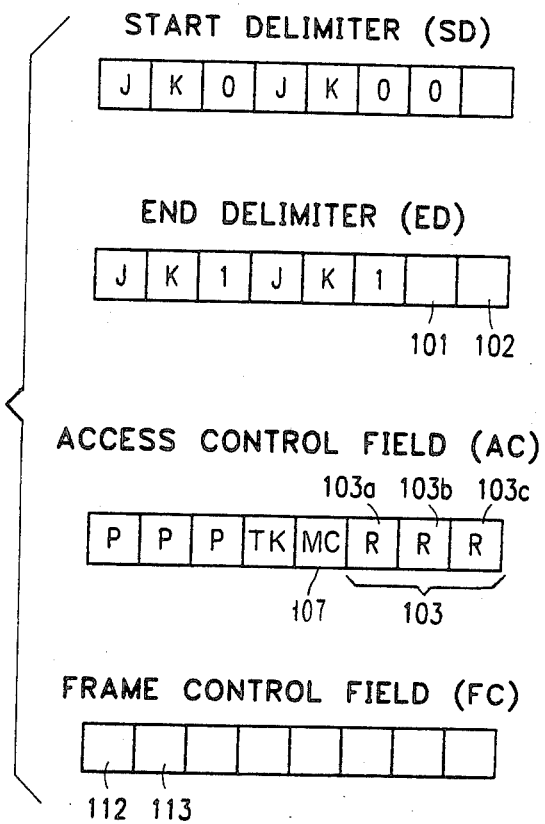
FIG. 5 illustrates the basic fields used for the token and frame formats.

The two types of delimiter fields are shown in FIG. 5. The start delimiter is used to indicate the start of a frame, while an end delimiter indicates the end of a frame. Each delimiter field has a length of eight bits and both fields use data and non-data symbols. For example, the start delimiter comprises the following symbols: J K O J K O O as shown in FIG. 4. The J's and K's are non-data symbols as described in the IEEE 802.5 Standard, while the zeros are just the zero binary bit as described above.

The packet must start with the eight symbols as shown in the start delimiter, otherwise, the packet shall not be considered valid. The end delimiter, on the other hand, must start with the symbols JK1JK1 before a receiving station shall consider the ending delimiter as valid. The end delimiter also has a intermediate frame bit 101 and an error detected bit 102. An intermediate bit transmitted as a 0 indicates that this packet is the last or only packet of a given transmission or call; otherwise the intermediate bit is transmitted as a 1. The error detection bit shall be transmitted as zero by the originating station. All other stations on the ring check the packets for error. If an error is detected by a station, the E bit is set to 1, otherwise the E bit is repeated as received.

Access Control Field

Again referring to FIG. 5, the access control field comprises eight control bits. The first three bits are priority bits PPP, and are used primarily to indicate the priority level of a token (described more fully below) and therefore which stations are allowed to seize the token.

Three bits allows for eight different priority levels. The fourth bit (TK) of the access control field is the token bit. A 0 indicates that the packet is a free token while a 1 indicates that the token is being used. The fifth bit 107 of the access control field is the monitor bit. This bit is used to prevent a token, frame or a signalling packet from continuously circulating the ring. If the monitor 21 of FIG. 1 detects a token or a frame with a monitor bit equal to 1, the ring is filled with idle signals and a new token is issued as in IEEE 802.5 standard. If the monitor detects a signalling packet with monitor bit equal to 1, the signalling packet is over written with idle signals. Finally, the last three bits of the access control field are the reservation bits (RRR). These bits allow stations with high priority packets to send a request in packets or tokens that the next token be issued at the requested priority. The reservation bits together shall also be referred to as the priority signalling field 103 while the individual reservation bits 103a, b, and c shall also be referred to as priority signalling bits.

Frame Control Field

Again referring to FIG. 5, the frame control field defines the type of the packet and certain medium access control and information packet functions. This control field comprises eight bits. The first two bits 112-113 are used to define the type of frame. For example, 00 indicates a Medium Access Control (MAC) frame and 01 indicates a logical link control frame. These types of packets are well known to those skilled in the art and are defined in the IEEE 802.5 standard.

Destination Address Field (DA)

This field can usually have up to 48 bits and is used to contain the address(es) for which the information field is intended, that is, the destination station or requested station. One or more addresses may be used as broadcast or group addresses. Included in the destination address field is a bit to indicate whether the destination address is an individual or group address. For 48 bit addresses only another bit is used to indicate either a universally or locally administered address.

Source Address Field (SA)

This field is used to indicate the address of the requesting station, that is, the station transmitting the frame or packet. This field has the same length and format as the destination address frame.

Information Field (INFO)

This field contains the data or message actually to be transmitted. This field is usually comprised of a number of octets and is intended for medium access control, network management and logical link control. No current length has to be specified because the information field is followed by a delimiter. The time required to transmit a frame however, may be no greater than the maximum token holding period.

Frame Check Sequence Field (FCS)

This field is generally a 32 bit frame check sequence using the standard cyclic redundancy check (CRC).

Frame Status Field (FS)

This field contains eight bits, some of which are reserved for future standardization in the IEEE 802.5 standard. The frame contains bits, which are used to indicate whether a frame has reached its requested destination station and whether a station has copied a frame into its received buffer.

Shown in FIG. 4 is the basic token format which comprises a start delimiter, an access control field and an end delimiter. These fields are described above. The actual token bit is in the access control field. The token format contains a free token when the token bit is 0. Initially, the ring monitor 21 releases a start delimiter, a frame header containing all zeros (i.e., '10' signal element pairs) in the access control field and in the address byte, followed by a sequence of ones (i.e., '01' signal element pairs referred to as idles). Thus, the frame header contains a free token indication because the TK bit is "0". Each station on the ring checks the incoming signals for the start delimiter, and then counts header bits and bytes. If it has data to transmit and its priority level is at least equal to the priority level of the token, it will convert the token bit (TK bit) which was "0" in an empty frame to "1", insert the source and destination address after the access control field and transmit its data followed by frame check sequence field, an end delimiter and frame status field. At this point, the station is said to have seized or captured the token. Immediately after transmitting its packet of data (which could include voice data), and without waiting for the header of the frame in which it transmitted its packet of data to return, the station will issue a new start delimiter and a new frame header with a free token indication (TK=0) to the ring. It will then start repeating the incoming bits. That is, the station releases the token. The priority level of the token is indicated by the access control field. If priority reservations are received before the issuance of the free token, then the token is released with PPP and RRR bits set as determined by the priority stacking protocol of the IEEE 802.5 standard.

Basic Scheme

The access protocol for two priority classes is first described. In general, the priority classes will be numbered 0 through N-1, (N=8, in IEEE 802.5 Standard) with larger number associated with higher priority. The priority class will be used to provide priority access of stations to the ring. That is, stations gain access to the ring in accordance with their assigned priority level. A station is assigned a priority level (PL) or is said to have an assigned priority level, if it has a packet of a certain priority level to transmit (send). A station can have several packets of different priority levels, and thus, a station can be assigned a range of priority levels. As described earlier, the current token priority level is determined by PPP bits of the AC field while the RRR bits are used for priority signalling. For the case of two priority levels, if PPP bits are 001, only priority class 1 stations may capture the token as it goes by. If this field is 000, both priority classes may capture the token.

Figure 6:
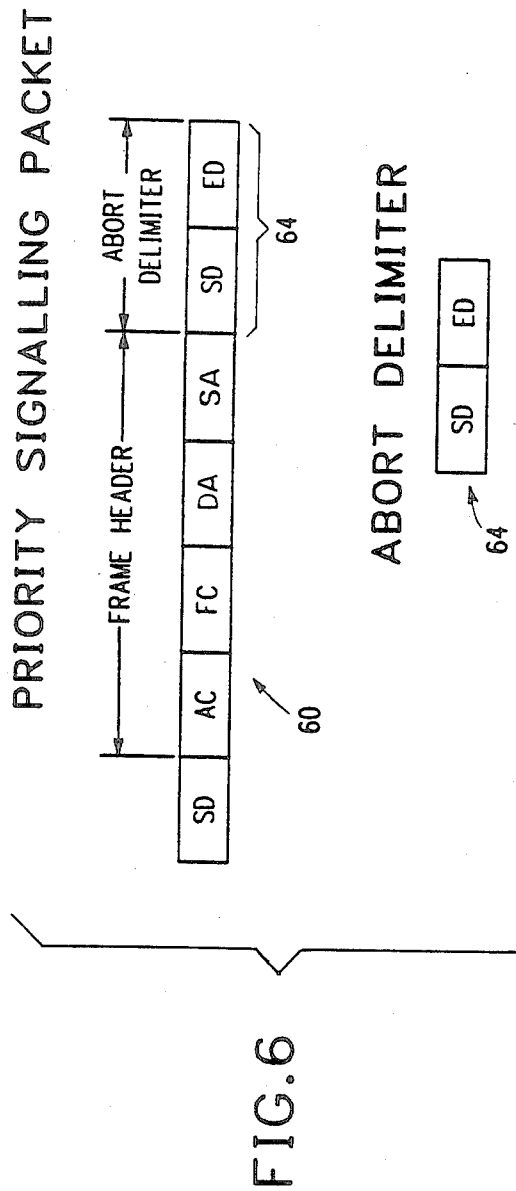
FIG. 6 illustrates the basic format of a priority signalling packet and an abort delimiter.
Figure 7A:
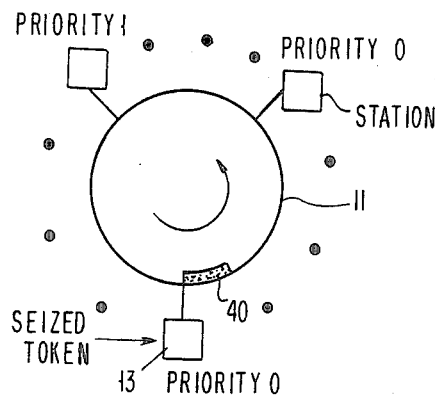
FIGS. 7a to 7f schematically illustrate the method of the invention of transmitting the token and updating the priority of the token.
Figure 7B:
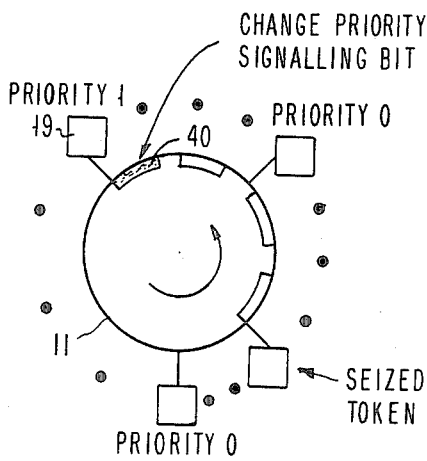
Figure 7C:
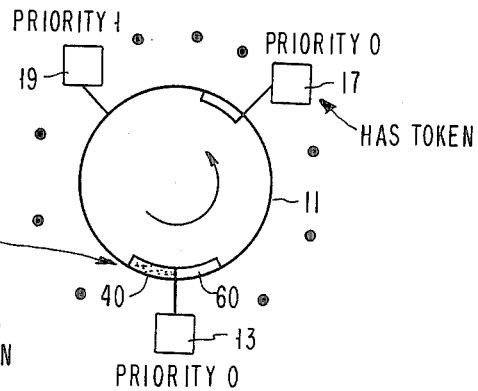
Figure 7D:
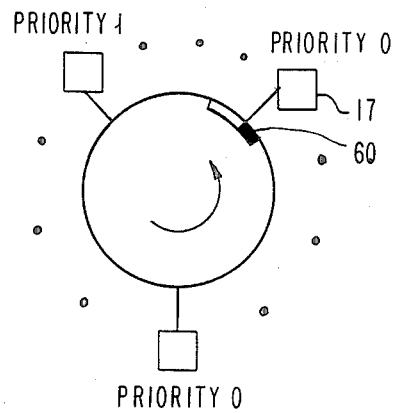
Figure 7E:
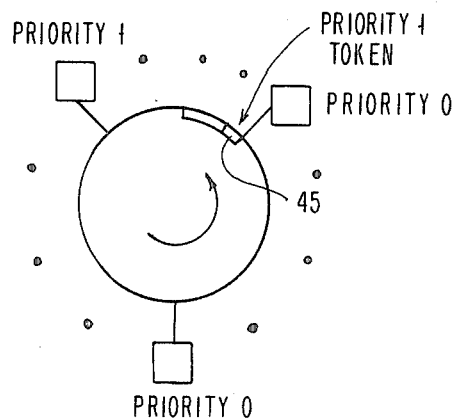
Figure 7F:
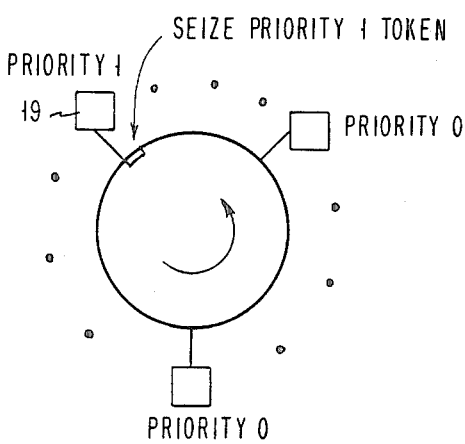

Referring to FIG. 6, there is shown a priority signalling packet 60, comprising: a start delimiter (SD), a frame header 62, a destination address field (DA) and a source address field (SA). The abort delimiter (also referred to the abort sequence") which is used for the purpose of terminating a frame prematurely is added at the end of the frame header to complete a priority signalling packet. Receiving stations can recognize the abort sequence. The priority signalling packet structure is as above so that the basic frame structure of the IEEE Standard 802.5 can be used with no changes. An alternative structure would be to assign a bit in a frame header to indicate a priority signalling packet.

The access protocol for this invention is as follows. Each station attached to the ring is assigned a priority level (0 or 1 for the two priority case). A station is assigned a priority level according to the priority level of the packet it wishes to send. A free token is transmitted around the ring. When the token reaches a station that has a packet to send, the token priority level is compared with the priority assigned to the station. If the token priority level is greater than the station priority level, the token is forwarded to the next station along the ring. If the token priority level is less than or equal to the station priority level, the station makes the token busy, transmits one information packet with the frame header priority level signalling field set to zero. This station then forwards a free token, to the next station without waiting for the packet it transmitted to get back to the station after traversing the ring (i.e., multiple token ring mode of operation). The priority level of the token in this case is unchanged if no priority signals are received by the station while transmitting the packet. Actions resulting from reception of priority signals are described below. As a packet goes by a station with priority 1, the station may change the priority signalling bits of the packet to 001 if it needs to send a packet.

Alternatively, the priority 1 station could create a priority signalling packet 60 with RRR bits set to 001. To avoid collisions with incoming packets, the priority station in this case, must insert sufficient buffer in the ring to hold a priority signal. This buffer is removed when the priority station gets the free token. When the above packet gets back to the transmitting station, the following action is taken. If the sending station still has the token (i.e., the frame is so long that the header comes back before the token has been forwarded) then the returning frame is discarded and the token priority level (PPP) is set to 001 when the token is released. This case is not of interest since it should not occur frequently, if at all, for cases where the multiple token is useful). If the transmitting station has already released the token, the incoming frame is discarded but simultaneously a priority signalling packet is sent out on the ring with the priority signalling bits unchanged (while the old frame is streaming in). The priority signalling packet will catch up with the token only if the token is seized by a station that is transmitting a packet. Thus, either the token reaches the high priority station first or the priority signalling packet reaches an intervening station that holds the token. In the latter case, the station finishes transmitting its packet and then releases the token with priority level set to 001. Thus, all intervening priority 0 stations will allow the token to get by to a high priority station. After this point, only high priority stations may seize and use the token until the token reaches the signalling high priority station.

An example of the basic scheme is illustrated in FIG. 7. For simplicity ring access units are not shown and only two priority levels (0 and 1) are used. First, a token is transmitted around the ring 11 with a first priority level, which is 0 in this particular example. Second, the token is seized by a first station, say 13, of the ring having a first packet to send (see FIG. 7A). The token is seized by a first station 13 only if the priority level assigned to the first station is greater than or equal to the priority level of the token. In this example, the priority level of the station and the first packet are 0. The first station 13 is assigned a priority level of 0 because the priority level of the first packet is assumed to be the highest priority level of any packet that the first station needs to transmit. Here, the priority level of the first packet is assumed to be zero. Third, the first station transmits a packet (one could say a frame 40 with a packet therein) (see FIG. 7A)). Fourth, the token is transmitted from the first station 13 on the ring, immediately after transmitting the first packet without waiting for the header of the frame 40 containing the first packet to return to the first station. The priority level, of the token just released (referred to as a second priority level), is determined as in the IEEE 802.5 Standard, without the benefit of the information contained in the header of the aforementioned frame 40. Fifth, while being transmitted around the ring 11 and back to the first station 13, the priority signalling bits (See 103a, b and c of FIG. 5.) in the aforementioned frame 40 can be changed if any station has an assigned priority level greater than the priority level indicated by the priority signalling bits in the frame 40 at the time the frame was initially transmitted from the first station 13. This change is accomplished by having each station examine the priority signalling bits as the frame reaches it. If upon examination the station needs to send a packet with a priority level greater than that indicated by the priority signalling bits in the frame, the priority signalling bits are changed. The signalling bits will be changed to correspond to the highest priority level of any packet needed to be sent by the station. Thus, after the frame 40 has reached all stations, the priority signalling bits in the priority signalling packet will correspond to the highest priority level of any packet needed to be sent by any of the stations of the ring. That is, the priority level indicated by the priority signalling bits of the frame corresponds to the highest assigned priority level of any station of the ring. In this example, the priority signalling bit of the frame is changed from 0 to 1 as shown in FIG. 7B at station 19, for example. Sixth, a priority signalling packet 60 (see FIG. 6) is then transmitted around the ring with the priority signalling bits therein corresponding to the priority level indicated by the frame. Thus, the priority signalling bits in the priority signalling packet 60 correspond to the highest assigned priority level of any station. In this case, the priority signalling bit of the priority signalling packet is 1. The transmission of the priority signalling packet is illustrated in FIG. 7C. A second station, say 17, meanwhile, seizes the token under the same conditions as with the first station 13 when it seized the token. The priority signalling packet 60 then reaches the second station 17 that has seized the token and changes the priority level of the token to match the priority level indicated by the priority signalling bits of the priority signalling packet. (See FIG. 7D.) In this example, the priority level of the token is being changed from 0 to 1 to correspond to the priority level of 1 indicated by the priority signalling bit. The token is then transmitted from the second station 17 and the process is repeated (See FIGS. 7E and 7F. As shown in FIG. 7F, the priority 1 token reaches a priority 1 station and is seized. In this case the station 19 seizing the priority 1 token is the same station that changed the priority signalling bits.

The worst case delay between the time a high priority station (a station with a high priority packet to transmit) needs the token and the time some high priority station gets the token is one ring propagation delay plus twice the packet transmission time.

This includes a worst case time of one packet transmission delay before a priority request can be made plus one propagation delay for signalling packet and token to get back to some high priority station plus one packet transmission time of a station that gets the signal while transmitting its packet. Note that after this delay some priority 1 station will get the token and not necessarily the requesting station. As a comparison, in the IEEE 802.5 Standard, the worst case delay between the time when a high priority station needs the token and the time at which some high priority station gets the token is twice the ring propagation delay plus one packet transmission time. In the multiple token protocol presented here, a lower priority station can be preempted as soon as a high priority signalling packet is received. This reduces the worst case delay to one propagation delay plus one packet transmission time. In either case, preemptive or non-preemptive signalling packets, average packet delays in multiple token protocol are far less than the single token protocol.

It is possible that the token may get to a priority 1 station that has set a priority reservation before the priority signalling packet catches up with the token. For very long rings and for rare cases, the requesting high priority station may get the token and transmit its packet before the signalling packet comes by. The source station has no way of knowing that this signalling packet was produced as a result of its request and must let it go by. The signalling packet will eventually catch up with the token and may cause a transition to priority 1. The transition back to low priority will then occur as in IEEE 802.5 Standard. This case can be eliminated if the signalling station places its address in the priority request. However, this would require an extension in the IEEE 802.5 Standard frame structure without significant performance benefit.

The protocol for two priority levels described above is easily extended to multiple priority levels. The priority stacking and unstacking works exactly as in the IEEE 802.5 Standard.

Voice Data Integration

The basic scheme described above is used basically for asynchronous transmission. This scheme could also be used for voice and data with voice traffic having priority 001 and data priority level 000, for example. However, a large variation in voice packet delay and poor performance would result. Hence it is preferable to transmit a train of voice packets, one packet from each voice source every time a transition to high priority is made. High efficiency is obtained by allowing multiple simultaneous packets on the ring. Further, it is necessary to prevent the high priority voice traffic from consuming the entire network bandwidth and starving the asynchronous data sources. Both these functions can be accomplished by having a voice controller connected to the network. This approach is described in the following paragraphs.

It is assumed that voice is allocated some maximum bandwidth. Call set-up is done by communicating with the voice controller at priority 000 (like a data source) and indicating the bandwidth requirement. If adequate bandwidth is available, given the existing voice traffic, and if the destination voice station is free the call set-up will be continued, otherwise a busy signal will be returned. It is assumed that the call set up is done by higher level protocols that will not be specified here. These higher level protocols are well know to those skilled in the art. Suffice it to say that the voice controller will only allow new calls if the voice bandwidth is not exceeded, thus ensuring no asynchronous data source starvation.

Figure 8:
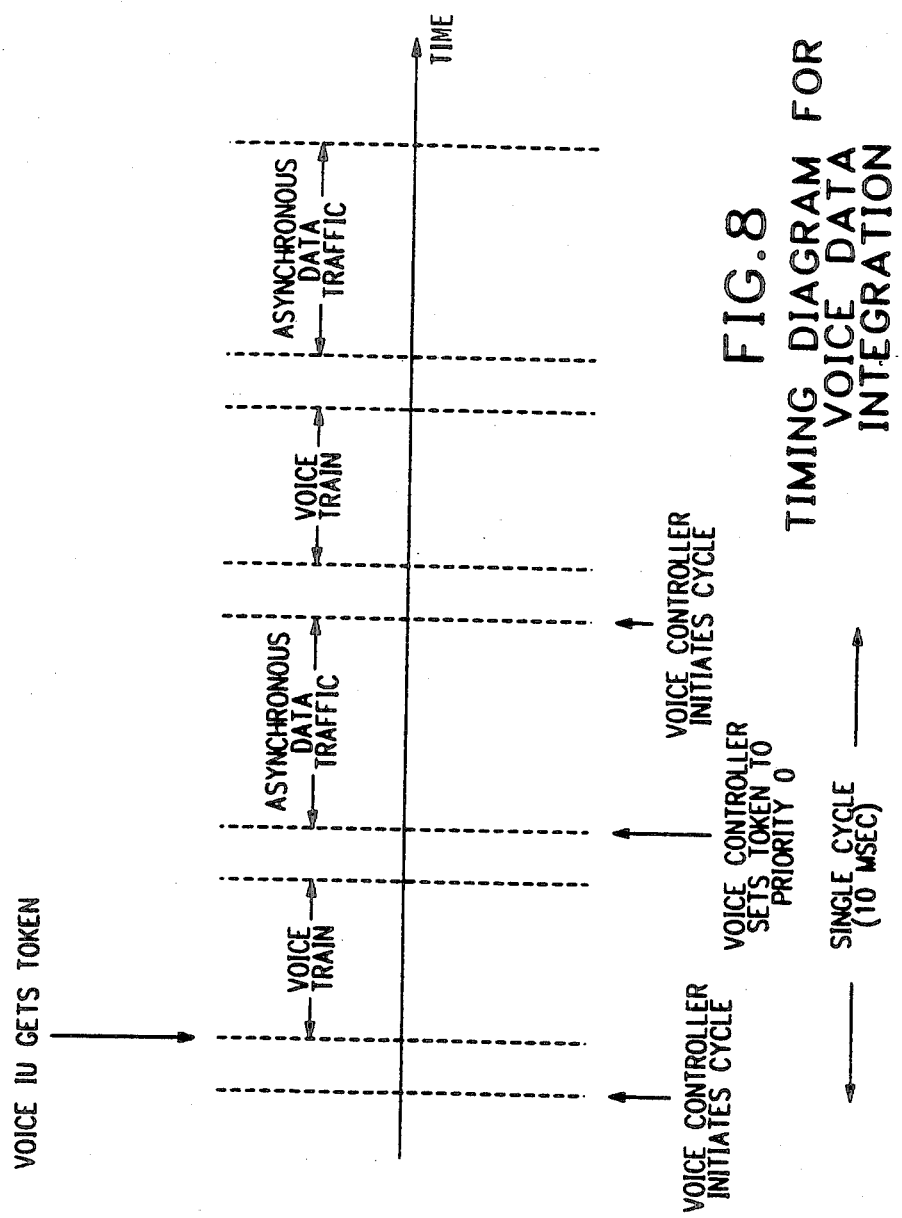
FIG. 8 shows the timing diagram for voice data integration using the voice controller.

The mode of operation is illustrated in FIG. 8. This mode of operation is described below using three priority levels (000 for call set-up data, 001 for voice controller and 010 for voice traffic) as an example.

Voice samples are accumulated and buffered at the source station. At fixed intervals (10 msec in FIG. 8) the voice controller initiates a voice cycle by using the basic scheme to create a priority level 001 token. After this, when the voice controller receives the token, say at level NNN, it releases the token at level 010. Voice sources will only capture priority level 010 tokens and will never attempt to create signalling packets. Note that this differs from the basic scheme where priority 010 stations could capture both priority 000 and 001 tokens. When the priority level 010 token is created, each voice (priority 010 station captures the token when it gets to it and sends a variable length packet consisting of all the accumulated voice samples. Thus, at fixed time intervals (10 msec plus time to change the token to priority 010, for the example in FIG. 8) a train of voice samples will be transmitted, leading to very efficient use of the medium. When the voice controller gets the priority 010 token for the second time in a cycle, it will demote it to the priority at which it originally received the token (level NNN), enabling data sources to access the ring.

Figure 9:
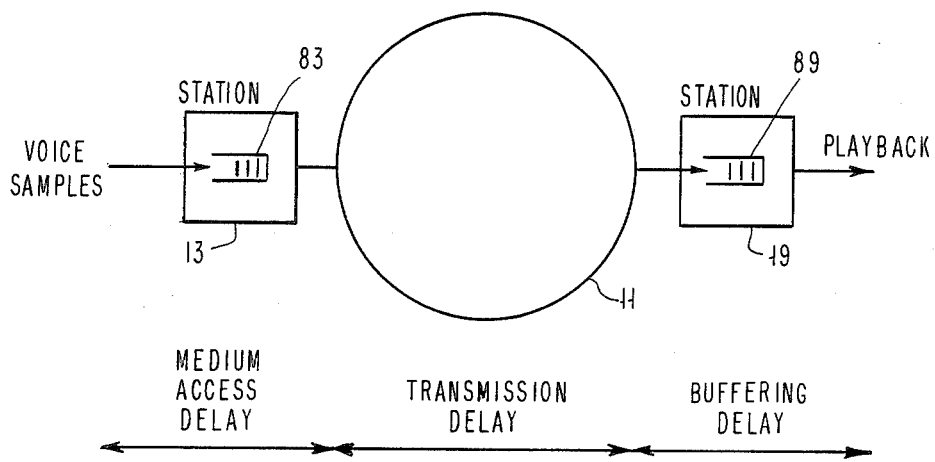
FIG. 9 schematically illustrates the components of delay for a set of voice samples.

The components of delay for a voice packet are shown in FIG. 9. Samples are buffered in buffer 83 of the source station until the station gets a priority level 1 token, leading to a medium access delay. The transmission delay includes clocking in the packet onto the ring 11, ring propagation delay and time to clock the packet into the buffer 83 at the destination station, 19 for example. Finally, packets are held for a buffer delay at the destination station to ensure that a continuous stream of samples can be played out.

The delay that a voice sample encounters in moving from source to destination is bounded but is variable, depending on the position of the token when the voice controller sends out a priority request. As shown in FIG. 8, the maximum voice packet delay is the voice cycle plus maximum time for the voice controller to get the free token after the voice cycle is initiated. The minimum voice packet delay (see FIG. 8) is the voice cycle minus the maximum time for the voice controller to get the free token after the cycle is initiated. Thus, the difference between the maximum and minimum voice packet delays is twice the maximum time for the voice controller to get the free token after initiating the cycle. The buffer delay is chosen as the difference between the maximum and minimum delays. The first packet in a conversation is delayed for the buffer delay. Following that, the buffer will never get empty before another packet of the conversation arrives.

In practice, it will probably be more cost effective to have a single station handle multiple voice and data sources located in close proximity. In such a case, the station can transmit voice samples from all connected phones when the token gets to it during a voice train. Simultaneously, data stations can be served using the data access protocol by using separate buffers for voice and data.

It is possible to support a few full motion (compressed) video sources on the network. If each video channel requires, say, 1.5 Mbps it is feasible to allocate a few video channels using the same controller as for the voice. The video channel can transmit during the voice train. For 10 msec intervals between voice cycles, about a 2 Kbyte video buffer will be required. Freeze frame video using voice transmission rates can be supported in an obvious manner.

A possible application of this network is to connect PBXs and LANs to each other in a metropolitan area. For this application, rather than supporting individual voice traffic, the synchronous bandwidth can be used to provide trunk traffic between the PBXs. With 10 msec between synchronous traffic trains, a 2 Kbyte buffer will be required for each 1.5 Mbps trunk, with operation as described above. About 30 such (virtual) trunks can be supported by allocating a maximum of 50 Mbps.

While the above scheme was described in terms of transmitting voice and asynchronous data, it is to be understood that this scheme is applicable, more generally, to the transmission of synchronous data and asynchronous data.

Differences from IEEE 802.5 Standard

The enhancements to the current IEEE 802.5 standard that must be made to implement this invention are described below.

During transmission, the change is to release the token immediately after transmitting a frame with a packet. The token is transmitted at priority level which is the greater of Pm or Rr. Pm is the value of the highest priority level of any packet stored at the transmitting station, and Rr is the value of the highest reservation made, by any of the stations of the ring, in the access control field of passing frames as described above in the description of the access control field. It should be noted that in the IEEE 802.5 standard, the token is released (or transmitted) after receiving the header of the frame containing the packet which the respective station just transmitted. With this invention, the token is released immediately. Notice that when a station that holds the token has completed transmission and is forwarding the free token, a priority signal may come in simultaneously. This requires that a buffer of at most three bytes be introduced into the ring when forwarding the free token. This buffer is removed from the ring when no part of any packet is contained in it. The priority stacks of the standard are directly applicable to the Medium Access Control (MAC) protocol described herein.

As in the IEEE 802.5 standard, during reception, the station transmitting the packet still removes the packet from the ring, however, instead of completely removing the packet, the station bypasses the packet. Once the receiver recognizes its Source Address (SA) it transmits an Abort Sequence and goes back to the listening mode. Thus, the priority request in the bypassed Access Control (AC) field is forwarded to the current transmitter which is somewhere downstream. During monitor operation, when the monitor gets a priority signalling packet with an MC bit set to 1, it replaces the priority signal by an idle sequence. Thus, priority signalling packets that have completed more than one rotation without any further reservations are discarded from the ring.

During priority reservation, in the IEEE 802.5 standard, reservations are made on every valid Access Control (AC) field that passes a station. The same technique could be used in the proposed invention, however, it may cause some unnecessary priority bump-ups on the ring when the ring is lightly loaded. The following scheme is used to avoid these unnecessary bump-ups. (Note: In the following a station believes that it has made a reservation even if its attempt to make a reservation is not successful because of a higher reservation already there in the (AC) field). Each station includes a reservation attempt made flag (RV) and a register for storing a priority level known as OLDPI. OLDPI is set to the value of Pr for a station at the time the station attempts to make a reservation request. Pr is the value of the PPP field in the last packet other than a priority signalling packet that was repeated by the respective station.

1. A station attempts to make a reservation on all tokens (TK bit=0). Any time a station attempts to make a reservation, it sets the monitor bit as 0 and makes the RV flag 1. Also, the current Pr is stored in the register OLDPI.

2. If a station has not attempted to make a reservation (RV=0), it attempts to make a reservation (a) on the first busy token (TK bit=1), (b) on a free token with a priority level greater than the priority level of any packet needed to be transmitted by the attempt station, or (c) by creating a priority signal and inserting a buffer in the ring.
3. If a station has attempted to make a reservation (RV=1), it attempts to make another reservation only if the priority level of the received frame (frame that reaches the station) is greater than the OLDPI value stored in the station, and only if the priority level of the received frame is greater than the priority level of any packet needed to be transmitted by the attempting station. Any time a station attempts to make a reservation, it transmits the monitor bit as zero, makes RV=1 and stores the current value of Pr in the register OLDPI.

Items 1, 2(a) and 2(b) above are normal IEEE 802.5 Standards, 2(c) expedites reservation handling, while item 3 assures that unnecessary bump-ups of the token priority level take place only under extremely rare conditions when the ring is lightly loaded.

It should be noted that a priority signalling packet never circulates indefinitely on the ring. Item 3 above ensures that the monitor bit (MC) on the signalling packet will never be set to 0 after the packet has completed one rotation of the ring. This is because a circulating frame or priority signalling packet always has the same priority level, and therefore, a reserving station would make at most one attempt at making a reservation on it (i.e., MC=0 would be transmitted only once by the reserving station) and monitor would see MC=1 in the next rotation and will replace the priority signal with idles.

The IEEE 802.5 standard does not define how the token passing mechanism may be used to transmit voice. Together with the minor changes suggested above, the token passing mechanism can be used very efficiently to give prioritized access and to transmit voice.

Besides using the monitor, there are other means of removing the circulating priority signalling packets. For example, the station that creates the signalling packet removes it by adding a buffer in the ring when the signalling packet is created and checking the RRR bits to determine whether any new reservations have been made. If not, the signal is replaced with idles and the buffer is removed when no information is contained in it.

Error Handling and Recovery

The operation of the LAN (Local Area Network) is highly dependent on the existence of the communication ring, a token, and a voice controller, if synchronous data is being transmitted. All these are susceptible to failures. Most of the recovery techniques given here have been derived from the IEEE 802.5 standard except for the proposal for two independent voice controllers.

A monitor function exists in each and every station, so that regardless of the number of active stations, the necessary monitoring functions take place. There is one and only one active monitor station on the ring at a time. The active monitor station takes the following actions for error conditions. A lost token is detected by the expiration of a timer. When the timer expires, the monitor station fills the ring with idles (purges the ring) and creates a new token. A circulating packet or frame is detected by using a monitor bit in the frame header. When the circulating frame or packet is detected, the monitor removes the frame. Multiple free tokens are detected by transmitting stations as follows. The only packet or frame that they should receive, while transmitting, is either a priority signalling packet or a frame with their own address as the source address. If not, they cease transmitting and do not create a free token. This situation is detected by the active monitor as the lost token situation, and therefore, it creates a new token after purging the ring. Hard failures, e.g., a broken ring, are detected by the downstream stations which use a beacon signal to inform the rest of the stations. Soft failures, e.g., intermittent bit or block errors, on a ring segment are detected by the downstream stations which use the check-sum and an error detected flag in the frame trailer to keep statistics of such failures. Ring management takes any necessary action when the frequency of such errors gets high.

When synchronous data is being transmitted, the existence of the voice controller on the ring is of extreme importance because all the synchronous traffic, such as voice, is dependent on it. Since the voice controller processes and stores a lot of information, e.g., network status, call connectivity, accounting, etc., one cannot expect each station to contain this function as a back-up. Therefore, for a quick recovery without any significant effects on the traffic, use of two voice controllers is suggested. They have independent stations and processors, mirrored primary memory, either mirrored or shared secondary memory, and are connected on different ring segments. The voice controller designated as primary starts the voice train at regular intervals as discussed earlier. If one or more successive voice trains fail to get started, the secondary voice controller assumes the role of the primary after broadcasting an appropriate message. This scheme affects the end-user minimally if at all.

Having thus described our invention, what we claim as new, and desire by Letters Patent is:

1. In a communications ring with a plurality of stations interconnected by the ring, wherein each respective station gains access to the ring by seizing a token having a priority level which is within a range of levels, each respective range corresponding to the priority levels of packets needed to be transmitted by each respective station, a method of transmitting the token around the ring and updating the priority level of the token, comprising:
    (a) transmitting the token on the ring from a first station of the ring immediately after the first station transmits a frame containing a packet needed to be transmitted, without waiting for the header of the frame to return to the first station;
    (b) transmitting on the ring a priority signalling packet from the first station after the first station transmits the token on the ring, the signalling packet containing information as to a particular priority level that the token should be updated to; and
    (c) changing the priority level of the token to correspond to the particular priority level when the priority signalling packet reaches the station of the ring that holds the token.

2. In a communications ring with a plurality of stations interconnected by the ring, wherein each respective station gains access to the ring by seizing a token having a priority level which is within a range of levels, each respective range corresponding to the priority levels of packets needed to be transmitted by each respective station, a method of transmitting the token around the ring and updating the priority level of the token, comprising:
- (a) transmitting the token on the ring from a first station of the ring immediately after the first station transmits a frame containing a packet needed to be transmitted, without waiting for the header of the frame to return to the first station;
- (b) transmitting on the ring an additional priority signalling packet from any station, other than said first station, that has a higher priority packet to send, the additional signalling packet containing information as to a particular priority level that the token should be updated to; and
- (c) changing the priority level of the token to correspond to the particular priority level when the priority signalling packet reaches the station of the ring that holds the token.

3. In a communications ring with a plurality of stations interconnected by the ring, wherein each respective station gains access to the ring by seizing a token having a priority level which is within a range of levels, each respective range corresponding to the priority levels of packets needed to be transmitted by each respective station, a method of transmitting the token around the ring and updating the priority level of the token, comprising:
- (a) transmitting the token on the ring from a first station of the ring immediately after the first station transmits a frame containing a packet needed to be transmitted, without waiting for the header of the frame to return to the first station;
- (b) transmitting on the ring a priority signalling packet from the first station after the first station transmits the token on the ring, the signalling packet containing information as to a particular priority level that a token should be updated to;
- (c) transmitting on the ring an additional priority signalling packet from any station, other than said first station, that has a higher priority packet to send, the additional signalling packet containing information as to a particular priority level that the token should be updated to; and
- (d) changing the priority level of the token to correspond to the particular priority level of any of the above priority signalling packets when that respective priority signalling packet reaches the station of the ring that holds the token.

4. A method as recited in claim 3, wherein the priority signalling packet, transmitted from a voice controller attached to the ring, with information that the token should be updated to a priority level that corresponds to synchronous data.

5. A method as recited in claim 4, wherein the synchronous data is voice data.

6. In a communications ring with a plurality of voice stations, data stations and a voice controller attached thereto, each station having a priority level assigned thereto if it has a packet to transmit, the voice stations having priority levels different from that of the data stations, a method of providing priority access for transmitting synchronous data and asynchronous data between the voice and data stations of the ring, each station gaining access to the ring by seizing a token with a priority level equal to the assigned priority level of the respective station, the method comprising the steps of:
- (a) transmitting the token on the ring from a first station of the ring immediately after the first station transmits a frame containing a packet needed to be transmitted, without waiting for the header of the frame to return to the first station;
- (b) transmitting on the ring a priority signalling packet which contains information as to a particular priority level that a token should be updated to, the signalling packet being periodically transmitted from the voice controller with a priority level corresponding to a priority level of the voice controller, the signalling packet also being transmitted from a data station after receiving the header of the last frame that the data station has transmitted on the ring, the header containing information as to the need of a data station, of a given priority level, to transmit a data packet, the signalling packet being used to update the priority level of the token that has been seized by a station attached to the ring;
- (c) changing the priority level of the token to correspond to the particular priority level when the priority signalling packet reaches the station that holds the token; and
- (d) changing the priority of the token, using the voice controller, to the priority level corresponding to voice traffic when the voice controller receives the token for the first time after having transmitted the priority signalling packet as in step (b).

7. A method of providing priority access to a communications ring for stations interconnected by the ring for transmitting information between the stations, comprising the steps of:
- (a) transmitting a token around the ring with a first priority level;
- (b) seizing the token by a first station of the ring having a first packet to send, if the token reaches the first station, and if the first designated priority level of the token is equal to or less than the priority level of the first packet;
- (c) transmitting the first packet around the ring from the first station after the token was seized by the first station;
- (d) transmitting the token with a second priority level from the first station, which seized the token, immediately after transmitting the first packet as in steps (c), without waiting for the header of the frame containing the first packet to return to the first station that transmitted the first packet;
- (e) changing at least one priority signalling bit in the frame containing the first packet to correspond to a higher priority level of any packet needed to be transmitted by any station of the ring, the higher priority level being a priority level higher than the priority level indicated by the priority signalling bits of the frame containing the first packet at the time the frame is initially transmitted from the first station, no priority signalling bit being changed if there is no packet with a higher priority level that needs to be transmitted;
- (f) transmitting a priority signalling packet around the ring with the priority signalling bits, of the priority signalling packet, indicating said higher level of steps (e);
- (g) seizing the token by a second station of the ring when the token reaches the second station, if the second station has a second packet to send with a priority level greater than or equal to the second priority level;

(h) changing, if the priority level of the token is lower than said higher level of step (e), the priority level of the token when the signalling packet reaches the second station, which has seized the token of the ring, the priority level of the token being changed to said higher level of step (e), which higher level is indicated by the priority signalling bits of the priority signalling packet; and (i) transmitting the token around the ring, from the second station, immediately after the second station transmits the second packet without waiting for the header of the frame containing the second packet to return to the second station, and repeating steps (b) through (h), but with the first priority level being changed to said higher level of step (e).

8. A method as recited in claim 7, wherein a priority level can only assume one of three possible values.

9. A method as recited in claim 7, wherein the token is at least one bit in a frame.

10. A method as recited in claim 7, wherein the frame, containing the token, comprises a start delimiter, an access control field and an end delimiter, the token being a bit in the access control field.

11. A method as recited in claim 7, wherein the priority signalling packet comprises a frame header and an abort sequence.

12. A method as recited in claim 7, wherein the priority signalling packet is transmitted around the ring immediately after the header of the frame containing the first packet is transmitted back to the first station without waiting for the rest of the frame containing the first packet to be received by the first station.

13. A method as recited in claim 7, wherein the priority signalling packet transmitted around the ring in step (f) comprises the frame header of the frame containing the first packet followed by an abort sequence.

14. A method as recited in claim 7, wherein the token is released from the second station as soon as the priority signalling packet reaches the second station without waiting for the second station to finish transmitting the second packet, if the priority level, indicated by the priority signalling bits in the priority signalling packet, is greater than the priority level of the second packet.

15. A method as recited in claim 7, wherein the token is released from the second station immediately after the second packet is transmitted from the second station without waiting for the header of the second packet to return to the second station that transmitted the second packet.

16. A method as recited in claim 7, wherein a monitor bit is set to indicate that a priority signalling bit has been changed as in step (e), and wherein the monitor bit is set to indicate that the priority signalling packet has been transmitted as in step (f) of claim 7.

17. A method, as recited in claim 7, wherein priority signalling packets are removed from the ring, which comprises a monitor, comprising the steps of:

setting a monitor bit to indicate that a priority signalling bit has been changed as in step (e) of claim 7, if said priority signalling bit had been changed as in claim 7;

setting the monitor bit to indicate that the priority signalling packet has been transmitted as in step (f) of claim 7, if said priority signalling packet has been transmitted as in claim 7;

delaying the monitor by a fixed number of bytes so the monitor can recognize the priority signalling packets; and removing the priority signalling packets after the priority signalling packets has passed the monitor for the second time without any new reservations made, and without completely purging the ring.

18. A method, as recited in claim 17, wherein the fixed number of bytes is approximately 3.

19. A method, as recited in claim 17, wherein a monitor detects the number of times that the frame passes the monitor unchanged with a monitor bit in the access control field of the frame.

20. In a communication ring with a plurality of stations attached thereto, and with each station capable of having an assigned priority level from one of three possible levels, a method of providing priority access to the ring for sending information between the stations, the method comprising the steps of:

(a) transmitting a token around the ring with a first priority level, the token being a bit in a frame comprising a start delimiter, an access control field and an end delimiter, the bit being in the access control field;

(b) seizing the token by a first station of the ring having a first packet to send, if the token reaches the first station and if the priority level of the token is equal to or less than the assigned priority level of the first station;

(c) transmitting the first packet from the first station on the ring after the token was seized by the first station;

(d) transmitting the token with a second priority level from the first station on the ring, immediately after transmitting the first packet, as in step (c), without waiting;

(e) seizing the token by a second station of the ring when the token reaches the second station, if the second station has a packet to transmit and the priority level assigned to the second station is greater than or equal to the second priority level;

(f) changing, if the priority level of the token is lower than said highest level of step (e), the priority level of the token when the signalling packet reaches the second station, which has seized the token of the ring, the priority level of the token being changed to said highest level of step (e), which highest level is indicated by the priority signalling bits of the priority signalling packet; and (g) transmitting the token around the ring, from the second station, immediately after the second station transmits the second packet without waiting for the header of the frame containing the second packet to return to the second station, and repeating steps (b) through (h), but with the first priority level being changed to said highest level of step (e).

* * * * *